US008248274B2

(12) United States Patent
Christophe et al.

(10) Patent No.: US 8,248,274 B2
(45) Date of Patent: Aug. 21, 2012

(54) METHOD FOR MONITORING THE FLIGHT OF AN AIRCRAFT

(75) Inventors: Laure Christophe, Colomiers (FR); Garance Raynaud, Cornebarrieu (FR); Nicolas Caule, Toulouse (FR); Andre Marques, Cugnaux (FR); Jean-Michel Merle, Veille-Toulouse (FR)

(73) Assignees: Airbus Operations SAS, Toulouse (FR); Airbus, Blagnac (FR)

( * ) Notice: Subject to any disclaimer, the term of this patent is extended or adjusted under 35 U.S.C. 154(b) by 636 days.

(21) Appl. No.: 12/562,775

(22) Filed: Sep. 18, 2009

(65) Prior Publication Data

US 2010/0073199 A1    Mar. 25, 2010

(30) Foreign Application Priority Data

Sep. 22, 2008  (FR) ...................................... 08 05184

(51) Int. Cl.
*G08B 23/00*    (2006.01)
(52) U.S. Cl. .................... 340/963; 340/539.28; 340/990
(58) Field of Classification Search .................. 340/963, 340/945, 539.28, 971, 973, 970, 968, 989–990, 340/978, 974, 975, 539.1
See application file for complete search history.

(56) References Cited

U.S. PATENT DOCUMENTS

| | | | |
|---|---|---|---|
| 6,456,226 B1 | 9/2002 | Zheng | |
| 7,030,780 B2 * | 4/2006 | Shiomi et al. ................. | 340/961 |
| 7,418,319 B2 * | 8/2008 | Chen et al. ....................... | 701/14 |
| 2002/0039070 A1 | 4/2002 | Ververs | |
| 2003/0222795 A1 * | 12/2003 | Holforty et al. ............... | 340/968 |
| 2004/0111192 A1 * | 6/2004 | Naimer et al. ..................... | 701/9 |
| 2004/0239550 A1 * | 12/2004 | Daly, Jr. ....................... | 342/26 B |
| 2007/0046670 A1 * | 3/2007 | Hedrick et al. ............... | 345/440 |

OTHER PUBLICATIONS

Preliminary Search Report dated May 14, 2009 w/ English translation.

* cited by examiner

*Primary Examiner* — Daniel Previl
(74) *Attorney, Agent, or Firm* — Dickinson Wright PLLC

(57) ABSTRACT

A method for monitoring the flight of an aircraft using two navigation screens respectively dedicated to a pilot and to a copilot of the aircraft is provided. The method includes displaying on the screens, depending on the choice of the pilot and the copilot, at least information relating to the following of terrain by the aircraft or information relating to meteorological conditions that the aircraft encounters during the flight, triggering at least one warning representative of hazardous meteorological conditions detected by the meteorological radar and liable to be encountered by the aircraft while the navigation screens of the pilot and copilot simultaneously are displaying the terrain-following information, wherein the at least one warning is triggered when the information relating to the hazardous meteorological conditions is located in a predetermined volume relative to the aircraft, and displaying the warning on at least one of the navigation screens.

8 Claims, 3 Drawing Sheets

METHOD FOR MONITORING THE FLIGHT OF AN AIRCRAFT

FIELD OF THE INVENTION

The present invention relates to a method for monitoring the flight of an aircraft making it possible to warn the pilot or pilots of potentially hazardous meteorological conditions likely to be located on or near the trajectory of the aircraft.

BACKGROUND OF THE INVENTION

Currently, it is the pilots who regularly check during the flight that the meteorological conditions ahead do not present any hazard to the aircraft and, therefore, its passengers and crew members, given the trajectory followed by the aircraft. For this, on aircraft such as current airliners, the pilots (pilot and copilot) have an onboard meteorological radar that makes it possible to detect and predict the meteorological conditions that the aircraft risks encountering, such as, for example, areas with a high moisture concentration, areas of turbulence, etc.

Therefore, the information relating to these meteorological conditions transmitted by the radar is displayed via two navigation screens on the flight deck of the airliners, one dedicated to the pilot, the other dedicated to the copilot. This "weather" information represented on the navigation screen or screens is monitored and analyzed by the pilots and, depending on how hazardous it is, the trajectory of the aircraft may or may not be modified.

Moreover, these navigation screens handle not only the monitoring of the information relating to the meteorological conditions transmitted by the radar, but also the monitoring of other information, notably information relating to the following of terrain by the airplane, in particular its trajectory, the other airplanes located nearby, airports, etc.

However, hitherto, the navigation screens could not simultaneously display both the "weather" information and the "terrain" information, so that the pilot had to make a choice according to the flight phases and conditions as to whether to monitor the required information as a priority. On airliners with two navigation screens, the pilot and the copilot share the monitoring task, the pilot monitoring the terrain information on his dedicated screen and the copilot monitoring the weather information on his dedicated screen, so that, for example, the threat of predictable bad weather conditions detected by the radar is viewed by the copilot, who then, with the pilot, takes appropriate decisions to avoid the threat.

However, it happens that, in certain situations, the pilot and the copilot both monitor the information relating to the following of terrain on their respective navigation screens, which no longer at this moment display the information relating to the meteorological conditions. So, if the radar, which is always operating even if the weather information is not displayed, detects a weather hazard on the trajectory of the airplane, the pilots will not be warned thereof and the airplane will enter into the area of disturbance, risking an unstable trajectory that is difficult to control and can lead to serious consequences for the passengers and crew members.

The aim of the present invention is to remedy this drawback.

To this end, the method for monitoring the flight of an aircraft using at least one navigation screen, of the type consisting in displaying on said screen, depending on the choice of a pilot, information relating to the following of terrain, notably the trajectory, by said aircraft or information relating to the meteorological conditions that the aircraft is likely to encounter during its flight and that is supplied by a meteorological radar on board said aircraft, is noteworthy, according to the invention, in that it further consists in triggering at least one warning representative of hazardous meteorological conditions detected by said radar and liable to be encountered by said aircraft, although said navigation screen is displaying the terrain-following information.

SUMMARY OF THE INVENTION

Thus, by virtue of the invention, even if the pilot, or both pilots in the case of an airliner, have displayed the terrain-following mode on the navigation screen or screens, they will be warned of the presence of an area of disturbance that risks crossing the trajectory of the airplane by the triggering of the warning and can then act accordingly to analyze the disturbance and, if necessary, modify the trajectory of the airplane. The monitoring of the flight of the aircraft is therefore optimized.

Advantageously, said warning is triggered on said navigation screen. In practice, since the screen is frequently consulted by the pilot, the warning will be viewed rapidly and the intervention and decision time will be reduced.

In a preferred embodiment, said alert takes the form of a message displayed on said navigation screen. This message can, moreover, be "customized" according to the type of disturbance to come, namely an area of turbulence, an area with high moisture concentration, a stormy area, etc., so that a number of meteorological hazards can be reported to the pilot.

Furthermore, this text message can have another type of notification of the warning associated with it.

For example, said warning appearing on said navigation screen can be accompanied by the automatic opening of a window corresponding to said meteorological conditions and be displayed on said navigation screen, partially or totally replacing the window relating to the following of terrain.

In another example, said warning appearing on said navigation screen is then accompanied by a bright area corresponding to said meteorological conditions and displayed on said navigation screen above the information relating to the following of terrain.

In yet another example, said warning appearing on said navigation screen is accompanied by a change of scale and of mode of representation of the information relating to the meteorological conditions displayed on said navigation screen.

Finally, said warning appearing on said navigation screen can be accompanied by an audible alarm, preferably repeating said warning message.

According to another characteristic of the invention, the method consists in triggering said warning when the information relating to the hazardous meteorological conditions is located in a predetermined volume relative to said aircraft.

Thus, according to this volume, the warning is triggered neither too early, which avoids disturbing the pilots who already have to manage many tasks simultaneously, nor too late, which enables the pilots to intervene and take the decisions that are needed depending on the areas of disturbances to come.

Moreover, a number of warning levels can be provided within this predetermined volume, making it possible to grade the hazard.

The figures of the appended drawing will clearly show how the invention can be produced. In these figures, identical references designate similar items.

Figure 1:
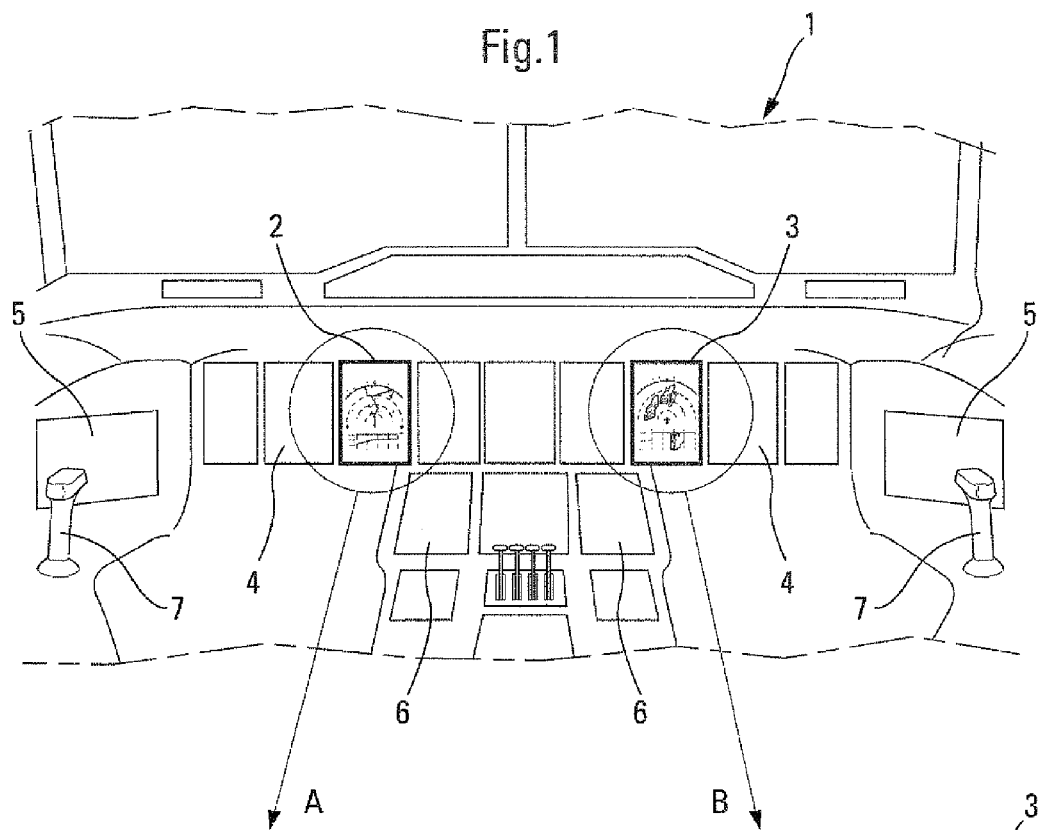
FIG. 1 is a partial and diagrammatic view of an aircraft flight deck equipped with two navigation screens on which are displayed respectively, on the enlargements A and B, the information relating to the following of terrain and the information relating to the meteorological conditions.
Figure 1:
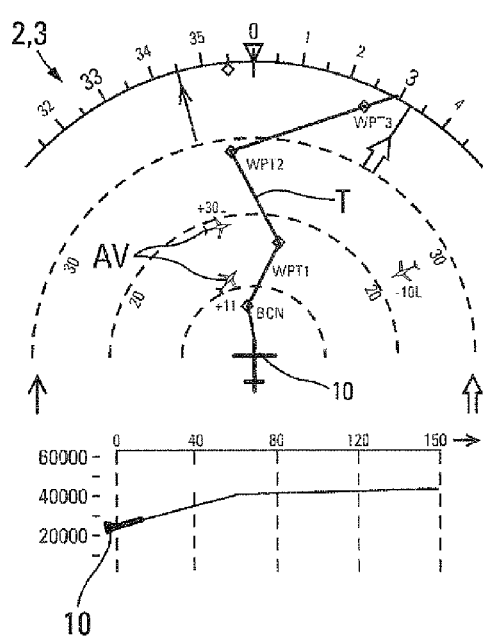
Figure 1:
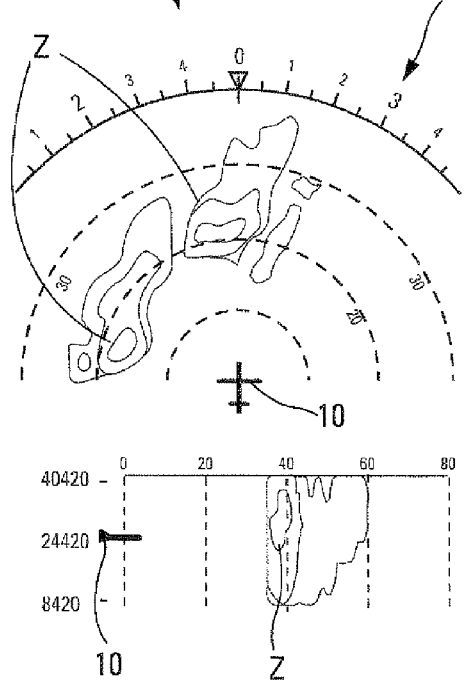

The flight deck or cockpit 1 diagrammatically represented in FIG. 1 is, for example, that of a standard airliner and, to this end, comprises identical navigation screens 2 and 3, of which one 2 is dedicated to the pilot and the other 3 to the copilot. Most of the other equipment and/or instruments situated on this flight deck 1 are also duplicated such as, for example, the main flight screens 4, the onboard information systems 5, the multifunction screens 6, the mini-sticks 7, etc.

DETAILED DESCRIPTION OF THE INVENTION

These navigation screens 2, 3, depending on the choice of and the instructions from the pilot and copilot, display in particular:
  either information relating to the following of terrain by airplanes symbolized by the reference 10, as shown on screen 2 in the enlargement A of FIG. 1, and that indicates the trajectory T in the plane of the airplane with the beacons BCN and way points WPT, the airplanes AV flying nearby, the cities and airports, etc., and in a vertical plane depending on the altitude of the airplane;
  or information relating to the future meteorological conditions predicted in the action radius of the screen, as shown on the screen 3 in the enlargement B of FIG. 1, and that indicates the areas of meteorological disturbances Z such as areas of turbulence, areas with high moisture concentration, etc. Two areas of disturbance Z have, for example, been illustrated in the enlargement B of FIG. 1 and are represented on the navigation screen 3, once again as seen from above from the airplane and in a vertical plane.

When the two navigation screens 2 and 3 indicate, through a deliberate choice on the part of the pilot and the copilot, for example due to overflying a region with difficult relief, the information relating to the following of terrain by the airplane 10 and the airplane is headed toward an area of meteorological disturbance Z, which will be detected by the meteorological radar (not represented in the figures) usually provided on board the airplane, a warning 11, according to the inventive monitoring method, is triggered on the flight deck 1 to thus warn the pilots of the imminence of the area of disturbance Z. This warning is advantageously made visible on the navigation screens 2 and 3 by the appearance of a message 12 that is displayed inside a box 13 situated below the symbolic representation of the airplane 10 on the screens.

Figure 2:
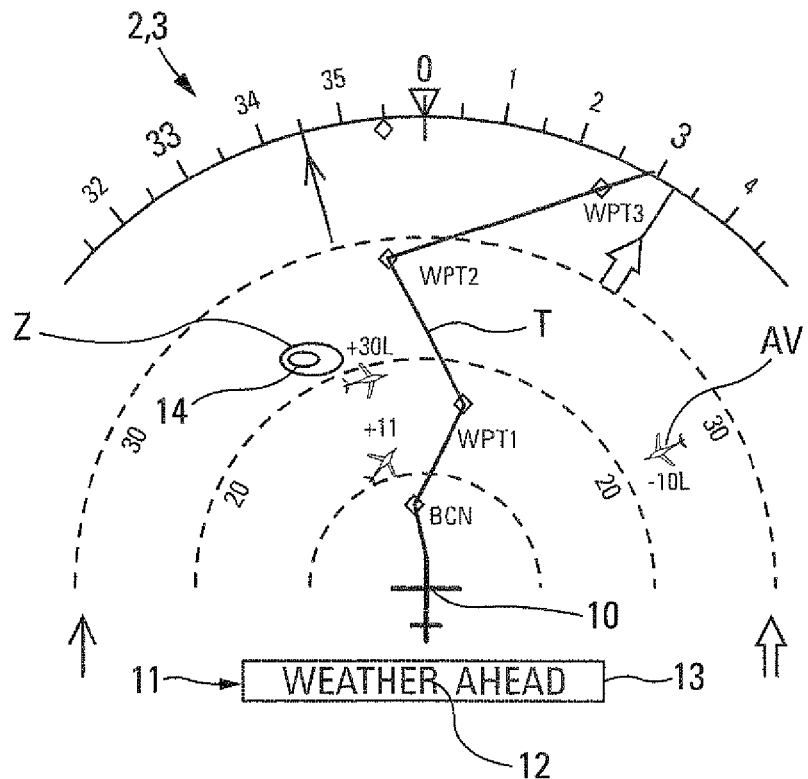
FIGS. 2 and 3 represent said navigation screens displaying the information relating to the following of terrain by the aircraft and, according to the invention, a warning concerning the meteorological conditions to come and its diagrammatic representation.

For example, FIG. 2 shows that a warning message "WEATHER AHEAD" is displayed on the navigation screen 2 or 3 representing the terrain-following information, notably the trajectory T of the airplane 10 with its beacons BCN and way points WPT, and the airplanes AV located in the area of flight by the airplane 10. The area of disturbance Z, corresponding to the warning message 12 and representative of a high moisture concentration, is also displayed on said screen. The latter can be displayed by an intermittent or continuous bright light 14, which is superimposed on the terrain-following information being viewed.

Figure 3:
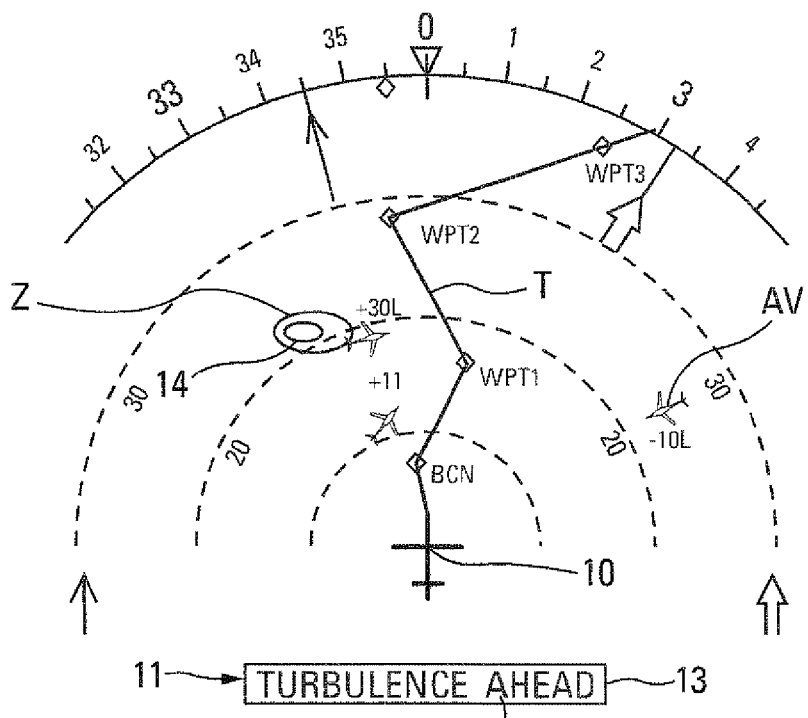

FIG. 3 is substantially similar to the preceding figure, apart from the fact that the message 12 triggered by the warning 11 now indicates "TURBULENCE AHEAD" in the box 13 of the navigation screen 2, 3 under the symbolically-represented airplane 10 and that the additional display in the form of a bright flash 14, representative of said area of turbulence to come Z detected by the radar, is overlaid on the terrain-following information.

Thus, the pilots are informed in real time of the meteorological conditions to come, even if they are consulting the information relating to the following of terrain by the airplane on their respected screens.

Obviously, different warning messages could be displayed depending on the nature of the meteorological disturbances to come (wind, snow, hail, etc.).

Moreover, other embodiments of the representation of the warning 11 indicating these bad meteorological conditions detected by the radar can be envisaged in addition to the message 12, simultaneously or following the latter.

For example, the warning message can be accompanied by a pop-up window or menu, not illustrated, representative of the information relating to the meteorological conditions and displayed automatically on the navigation screen or screens, then replacing the terrain-following information.

Another embodiment of the warning 11, in addition to said message triggering the warning, consists in appropriately modifying the scale of the navigation screen by enlarging, by a zoom function, the area of disturbance displayed on said screen. The mode of representation of the navigation screen can also be modified by switching from a 180° representation mode, as shown in FIGS. 2 and 3, to a 380° representation mode in the manner of a wind rose, not illustrated, in order to clearly view the meteorological situation and the hazard that have triggered the warning.

Also, the warning message that is displayed in the appropriate box of the navigation screens 2 and 3 can be accompanied by an audible warning which informs the pilots of the hazard to come detected by the radar and which, for example, repeats the words of the warning message appearing in the box on the navigation screens.

Thus, depending on the warning message displayed on the screens and, possibly, one or more of the other embodiments of the warning, the represented trajectory T of the airplane will, if necessary, be diverted relative to that illustrated in FIGS. 2 and 3, to avoid having the airplane undergo the effects of the area of disturbance.

Furthermore, in the inventive method, it is particularly advantageous to trigger the warning only when a meteorological hazard, detected by the radar, enters into a predetermined safety or proximity volume V defined relative to the airplane and situated in front of the latter. In practice, the warning 11 delivered by the text message 12 must be triggered early enough to warn the pilots, who consult the terrain-following information on their screens, of an area of disturbance likely to be located on the trajectory of the airplane, but it must not be triggered too early, or in an untimely manner, when there is no real hazard to the airplane so as not to unnecessarily interrupt the pilots in their numerous tasks. Thus, this volume V is of great importance.

Figure 4:
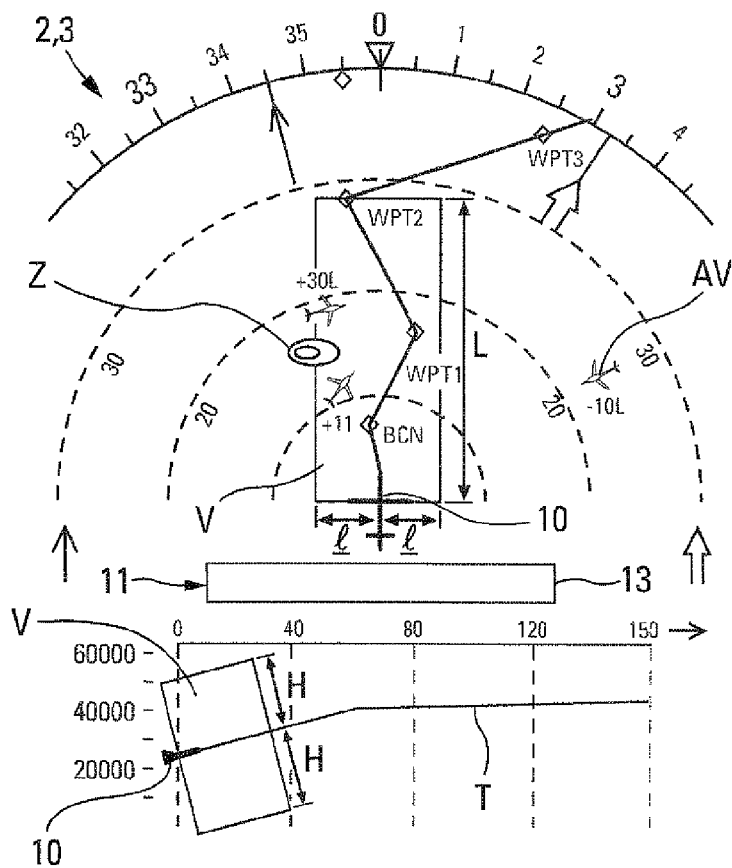
FIGS. 4 and 5 represent on said screens two respective proximity volumes relative to said aircraft making it possible to trigger said warning.

For example, as shown in FIG. 4, this predetermined volume V, making it possible to trigger the warning 11, is set relative to the airplane 10 and has a parallelepipedal form centered relative to the nose of the airplane and defined, in the representation in the horizontal plane (top part of the navigation screen 2 or 3), by a length L in front of the airplane and expressed in minutes of flight or in miles and a width l on either side of the airplane and expressed in miles or in RNP (Required Navigation Precision) units corresponding to a number of miles and, in the representation in the vertical plane (bottom part of the navigation screen), by a height H above and below the airplane and expressed in feet or as a difference in flight levels along the current vertical trajectory of the airplane.

Figure 5:
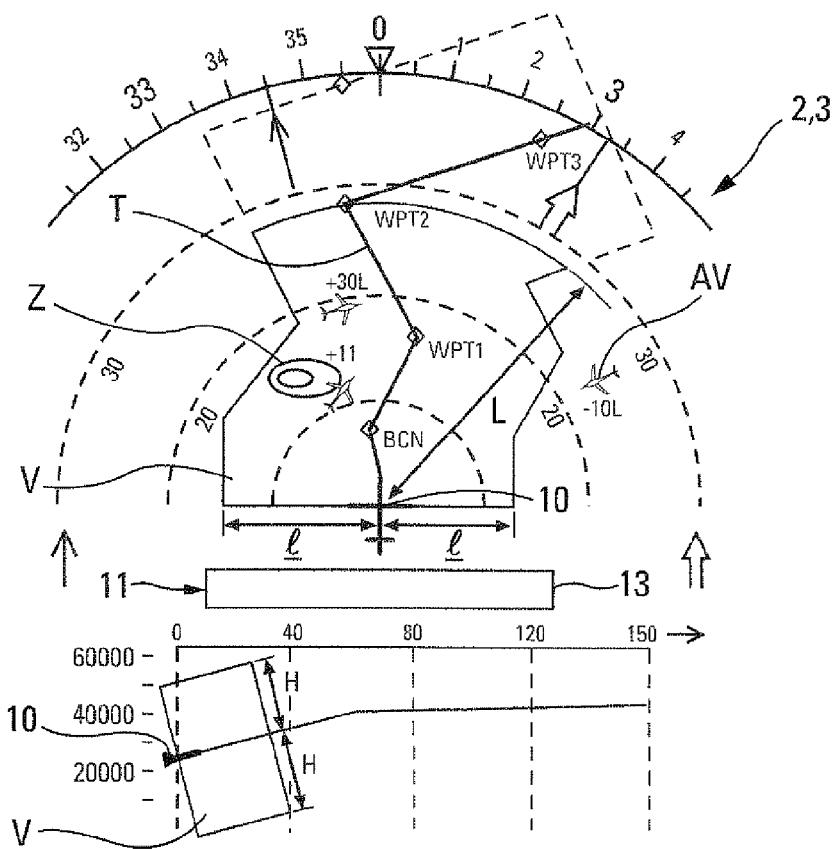

In the representation illustrated in FIG. 5, the predetermined safety volume V follows, not the longitudinal direction of the airplane as in FIG. 4, but its forecast trajectory T in its lateral flight plane. In this case, the width l of the volume that is centered relative to the airplane on the screens then parallels the trajectory T along a broken line, its length L and height H (on the bottom part of the screen) being identical to the preceding representation.

Moreover, as FIGS. 4 and 5 show, it can be seen that a hazardous area of disturbance Z has entered into the predetermined volumes V following the radar detection, while the pilots are displaying the terrain-following information, leading to the triggering of the warning 11.

Therefore, in this predetermined volume V, a number of warning levels can be provided depending on whether the hazardous area of disturbance Z, detected by the radar, is located closer to or further away from the airplane 10. For example, three levels can be considered within said predetermined volume V, which is then "subdivided" into three subvolumes: a first subvolume, the most remote from the airplane and corresponding to a level of information intended to analyze the area of disturbance with no action to be undertaken; a second, intermediate subvolume corresponding to a level of caution or of warning with a decision to be taken depending on the analysis of the identified meteorological area; and a third subvolume, the closest to the airplane and involving an immediate action on the part of the crew.

The invention claimed is:

1. A method for monitoring a flight of an aircraft using two navigation screens respectively dedicated to a pilot and to a copilot of said aircraft, of the typo consisting in the method comprising:

displaying on said screens, depending on the choice of the pilot and the copilot, at least information relating to the following of terrain, notably a trajectory, by said aircraft or information relating to meteorological conditions that the aircraft encounters during the flight, the information relating to the meteorological conditions is supplied by a meteorological radar on board said aircraft;

triggering at least one warning representative of hazardous meteorological conditions detected by said meteorological radar and liable to be encountered by said aircraft while said navigation screens of said pilot and copilot simultaneously are displaying the terrain-following information, wherein said at least one warning is triggered when the information relating to the hazardous meteorological conditions is located in a predetermined volume relative to said aircraft, and the predetermined volume relative to said aircraft is represented in a horizontal plane and in a vertical plane on said navigation screens; and displaying said warning on at least one of said navigation screens.

2. The method as claimed in claim 1,
wherein said warning appears in the form of a message displayed on said navigation screen.

3. The method as claimed in claim 1,
wherein said warning appearing on said navigation screen is accompanied by the automatic opening of a window corresponding to said meteorological conditions and displayed on said navigation screen, partially or totally replacing the window relating to the following of terrain.

4. The method as claimed in claim 1,
wherein said warning appearing on said navigation screen is accompanied by a bright area corresponding to said meteorological conditions and displayed on said navigation screen above the information relating to the following of terrain.

5. The method as claimed in claim 1,
wherein said warning appearing on said navigation screen is accompanied by a change of scale and of mode of representation of the information relating to the meteorological conditions displayed on said navigation screen.

6. The method as claimed in claim 1,
wherein said warning appearing on said navigation screen is accompanied by an audible alarm.

7. The method as claimed in claim 1,
wherein the horizontal plane includes a length in front of the aircraft and a width on the right and the left side of the aircraft, and the vertical plane includes a height above and below the aircraft.

8. The method as claimed in claim 7, further comprising:
providing a plurality of warning levels in said predetermined volume.

* * * * *